United States Patent
Park

(10) Patent No.: US 10,423,251 B2
(45) Date of Patent: Sep. 24, 2019

(54) METHOD OF FABRICATING WINDOW PANEL AND OF FABRICATING WINDOW PANEL INTEGRATED TYPE TOUCH SCREEN PANEL

(71) Applicant: LG DISPLAY CO., LTD., Seoul (KR)

(72) Inventor: Sangdae Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 259 days.

(21) Appl. No.: 15/399,645

(22) Filed: Jan. 5, 2017

(65) Prior Publication Data

US 2017/0115763 A1   Apr. 27, 2017

Related U.S. Application Data

(60) Division of application No. 13/242,172, filed on Sep. 23, 2011, now Pat. No. 9,552,085, and a division of application No. 15/054,014, filed on Feb. 25, 2016, now Pat. No. 10,248,230, which is a continuation of application No. 13/242,172, filed on Sep. 23, 2011, now Pat. No. 9,552,085.

(30) Foreign Application Priority Data

Dec. 6, 2010 (KR) .................... 10-2010-0123829

(51) Int. Cl.
   *B32B 3/10* (2006.01)
   *G06F 3/041* (2006.01)

(52) U.S. Cl.
   CPC .... *G06F 3/041* (2013.01); *G06F 2203/04103* (2013.01); *Y10T 428/239* (2015.01)

(58) Field of Classification Search
   None
   See application file for complete search history.

(56) References Cited

U.S. PATENT DOCUMENTS

| 7,180,665 B2 | 2/2007 | Daniel et al. |
| 7,633,747 B2 | 12/2009 | Yang et al. |
| 8,568,600 B2 | 10/2013 | Kang et al. |
| 2006/0183518 A1 | 8/2006 | Emano |
| 2008/0055511 A1 | 3/2008 | Park et al. |
| 2010/0182274 A1 | 7/2010 | Kang et al. |
| 2010/0206008 A1 | 8/2010 | Harvey et al. |
| 2010/0238119 A1 | 9/2010 | Dubrovsky et al. |

(Continued)

FOREIGN PATENT DOCUMENTS

| JP | 2008-007360 A | 1/2008 |
| KR | 20100084257 A | 7/2010 |

(Continued)

OTHER PUBLICATIONS

Korean Office Action dated Nov. 18, 2016 for the counterpart Korean patent application No. 10-2010-0123829.

(Continued)

*Primary Examiner* — Christopher M Polley
(74) *Attorney, Agent, or Firm* — Morgan, Lewis & Bockius LLP

(57) ABSTRACT

A window panel for a display apparatus is provided comprising a first reinforced layer formed at a first predetermined depth from entire upper and lower surfaces, a second reinforced layer formed at a second predetermined depth from a side surface connecting an edge of the upper surface and an edge of the lower surface, and a non-reinforced portion formed at at least a portion of the side surface.

20 Claims, 10 Drawing Sheets

(56) References Cited

U.S. PATENT DOCUMENTS

2010/0273530 A1  10/2010  Jarvis et al.
2010/0291353 A1  11/2010  Dejneka et al.

FOREIGN PATENT DOCUMENTS

WO   2010/101961 A2   9/2010
WO   2010/126977 A1   11/2010

OTHER PUBLICATIONS

Taiwanese Office Action dated Sep. 26, 2013 for the Taiwanese Patent Application No. 100142995.
British Office Action dated Apr. 12, 2013 for corresponding application No. GB1223373.0.
British Office Action dated Mar. 8, 2012 for corresponding application No. GB1120929.3.
German Office Action dated Mar. 8, 2013 for corresponding German patent application No. 102011086683.3.

METHOD OF FABRICATING WINDOW PANEL AND OF FABRICATING WINDOW PANEL INTEGRATED TYPE TOUCH SCREEN PANEL

This application is a Divisional application of U.S. patent application Ser. No. 13/242,172, filed on Sep. 23, 2011 and of U.S. patent application Ser. No. 15/054,014, filed on Feb. 25, 2016, which is a Continuation of U.S. patent application Ser. No. 13/242,172, and also claims the benefit of Korea Patent Application No. 10-2010-0123829 filed in Korea on Dec. 6, 2010. The entire contents of all of the above-identified applications are incorporated herein by reference for all purposes as if fully set forth herein.

BACKGROUND

Field

The embodiments of this document are directed to a window panel for a display apparatus and a method of manufacturing the window panel, and a window panel integrated type touch screen and a method of manufacturing the touch screen.

Related Art

Display apparatuses, such as liquid crystal displays, field emission displays (FEDs), electroluminescent displays, and plasma display panel displays, attract attention due to high response speed, low power consumption, and high color reproduction ratio. Such display apparatuses are used for various electronics including TVs, computer monitors, laptop computers, mobile phones, displays for refrigerators, personal digital assistants, automated teller machines. In general, these display apparatuses constitute an interface with users using various input devices, such as a keyboard, mouse, digitizers, or more. However, the keyboard or mouse is disadvantageous in that a user needs to learn how to use and it occupies a space. In response to increased demand for simple and less malfunctioned input devices, touch screen panels have been suggested that allow a user to directly input information with his/her hand or pen.

Because the touch screen panel has a simple configuration, which minimizes erroneous operations, the user can perform an input action without using a separate input device, and can quickly and easily manipulate through contents displayed on a screen. Accordingly, the touch screen panel has been applied to various display devices. Such touch screen panels are weak in scratches or bending when information is input on the touch screen panel using fingers or pen, and thus require a window panel to be attached thereon in order to prevent the touch screen panels from being scratched and bended. However, adding the window panel leads to an increase in thickness of the entire touch screen panel.

Accordingly, there have been suggested methods of fabricating a touch screen panel by reinforcing a window panel and then forming touch electrodes on a surface of the window panel. This method eliminates the need of a separate substrate for the touch screen panel, thus resulting in a decrease in thickness of the touch screen panel.

Such fabricating methods include a cell unit window panel fabricating method and a sheet unit window panel fabricating method. In the cell unit window panel fabricating method, a whole sheet glass substrate is cut into a plurality of cells and the cells are separately subjected to a reinforcing treatment. In the sheet unit window panel fabricating method, a whole sheet glass substrate is firstly reinforced and then cut into a plurality of cells.

However, the "first-cut-and-next-reinforcement" characteristics of the cell unit window panel fabricating method cause it difficult to guarantee mass productivity. Moreover, the cell unit window panel fabricating method generally needs to use a jig when forming touch electrodes on the cut cell unit unit window panels, which renders work hard due to x, y, and z-axis tolerances between each cell unit unit window panel and a seating portion of the jig on which the cell unit unit window panel is rested or a deviation of each cell unit unit window panel, thus resulting in a lowering of throughput.

In contrast, the sheet unit window panel fabricating method subjects a whole sheet glass substrate to a reinforcing treatment, so that time required for reinforcing treatment can be saved. Further, it is not necessary to form touch electrodes on the cell unit window panels one by one, which can increase fabrication throughput.

In the conventional sheet unit window panel fabricating method, however, when the reinforced whole sheet glass substrate is cut into a plurality of cells, loss of reinforced layers occurs at the cutoff surfaces together with tiny cracks as shown in FIG. 1. FIG. 1 is a photomicrography taking a picture of a cutoff surface of a reinforced whole sheet substrate, wherein tiny cracks are created at the cutoff surface.

As a consequence, the conventional sheet unit window panel fabricating method requires a polishing process for polishing the cutoff surface using a polishing machine to remove the cracks from the cutoff surface. Further, since the cutoff surface remains with the reinforced layers lost, the cutoff surface needs to be reinforced once more to maintain durability. As such, the conventional sheet unit substrate window panel fabricating method requires additional polishing and reinforcing processes.

SUMMARY

Exemplary embodiments of this document provide a window panel and a method of manufacturing the window panel, and a window panel integrated type touch screen panel and a method of manufacturing the touch screen panel, which can enhance workability and productivity.

The embodiments of this document will become readily apparent by reference to the following detailed description when considered in conjunction with the accompanying drawings.

According to an embodiment, there is provided a window panel for a display apparatus comprising a first reinforced layer formed at a first predetermined depth from entire upper and lower surfaces, a second reinforced layer formed at a second predetermined depth from a side surface connecting an edge of the upper surface and an edge of the lower surface, and a non-reinforced portion formed at at least a portion of the side surface.

The first and second reinforced layers are formed on the entire window panel except for the non-reinforced portion.

The side surface of the window panel comprises front, rear, left, and right surfaces, the first reinforced layer comprises upper and lower reinforced layers formed at the first predetermined depth from the upper and lower surfaces, respectively, of the window panel, the second reinforced layer comprises front, rear, left, and right reinforced layers formed at the second predetermined depth from the front, rear, left, and right surfaces, respectively, and the non-reinforced portion is formed at a part of at least one of the front, rear, left, and right surfaces.

The non-reinforced portion is formed at a corner of the window panel to separate the front reinforced layer from the left and right reinforced layers and to separate the rear reinforced layer from the left and right reinforced layers.

The window panel comprises a window area and peripheral area, and the window panel comprises an ornament layer formed corresponding to the peripheral area.

According to an embodiment, there is provided a touch screen panel comprising a window panel including a first reinforced layer formed at a first predetermined depth from entire upper and lower surfaces, a second reinforced layer formed at a second predetermined depth from a side surface connecting an edge of the upper surface and an edge of the lower surface, and a non-reinforced portion formed at at least a portion of the side surface, and a touch electrode layer on a surface of the window panel.

According to an embodiment, there is provided a method of manufacturing a window panel comprising preparing for a transparent substrate having a predetermined size, removing portions of the transparent substrate to form a plurality of cell unit window panels connected to each other by at least one connection portion, reinforcing the plurality of cell unit window panels, and removing the connector from the plurality of cell unit window panels to separate the plurality of cell unit window panels from each other.

According to an embodiment, there is provided a method of manufacturing a window panel integrated type touch screen panel comprising preparing for a transparent substrate having a predetermined size, removing a portion of the transparent substrate to form a plurality of cell unit window panels connected to each other by at least one connection portion, reinforcing the plurality of cell unit window panels, forming touch electrodes on the plurality of cell unit window panels, respectively, to form a plurality of touch screen panels, and removing the connection portion from the plurality of cell unit window panels to separate the plurality of touch screen panels from each other.

Removing the portion of the transparent substrate to form a plurality of cell unit window panels comprises forming a molding layer having shapes of the cell unit window panels on the transparent substrate, and removing the portion of the transparent substrate according to the molding layer to form the plurality of cell unit window panels connected to each other by the connection portion.

Removing the portion of the transparent substrate is performed by any one of an etching process, a laser process, and a mechanical process.

Reinforcing the plurality of cell unit window panels comprises dipping the plurality of cell unit window panels in a reinforcement solution containing potassium nitrate.

BRIEF DESCRIPTION OF THE DRAWINGS

The accompanying drawings, which are included to provide a further understanding of the embodiments and are incorporated in and constitute a part of this specification, illustrate embodiments of this document and together with the description serve to explain the principles of the embodiments of this document. In the drawings.

DETAILED DESCRIPTION OF THE EMBODIMENTS

Figure 1:
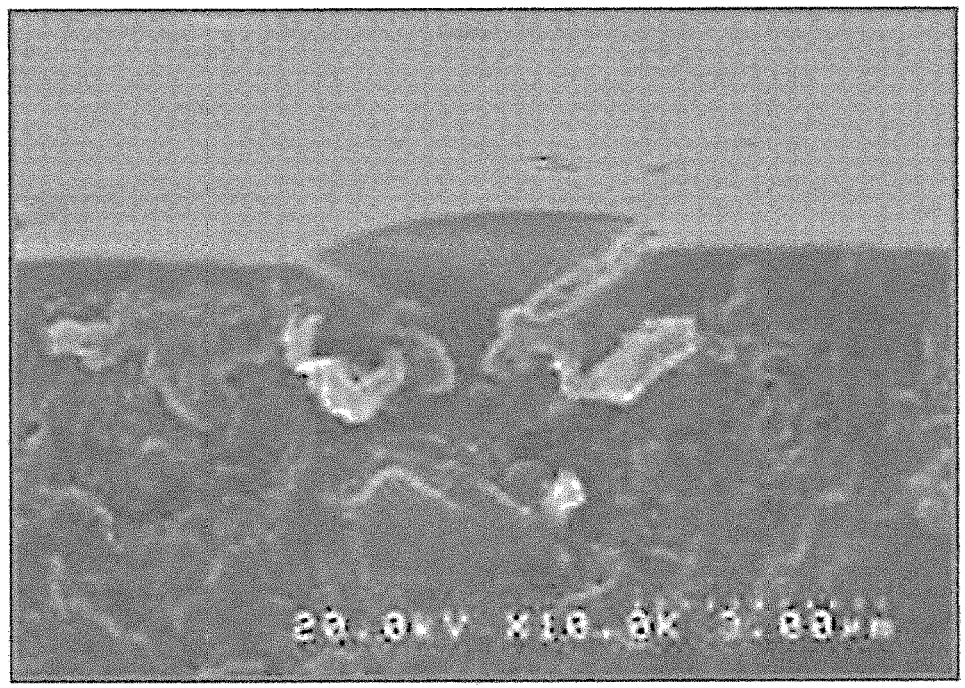
FIG. 1 is a phogomicrography taking a picture of cracks occurring at a cutoff surface when manufacturing window panels according to a conventional sheet unit window panel fabricating method.

Hereinafter, embodiments of this document will be described in greater detail with reference to the accompanying drawings, wherein the same reference numerals may be used to denote the same or substantially the same elements throughout the specification and the drawings.

Figure 2A:
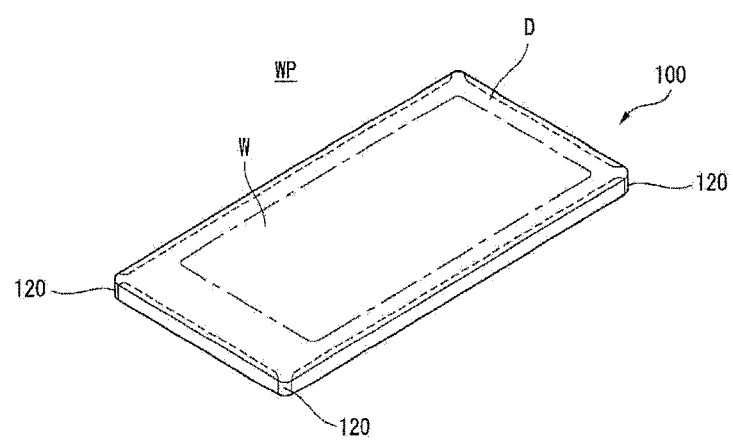
FIG. 2A is a perspective view illustrating a window panel according to an embodiment of this document.
Figure 2B:
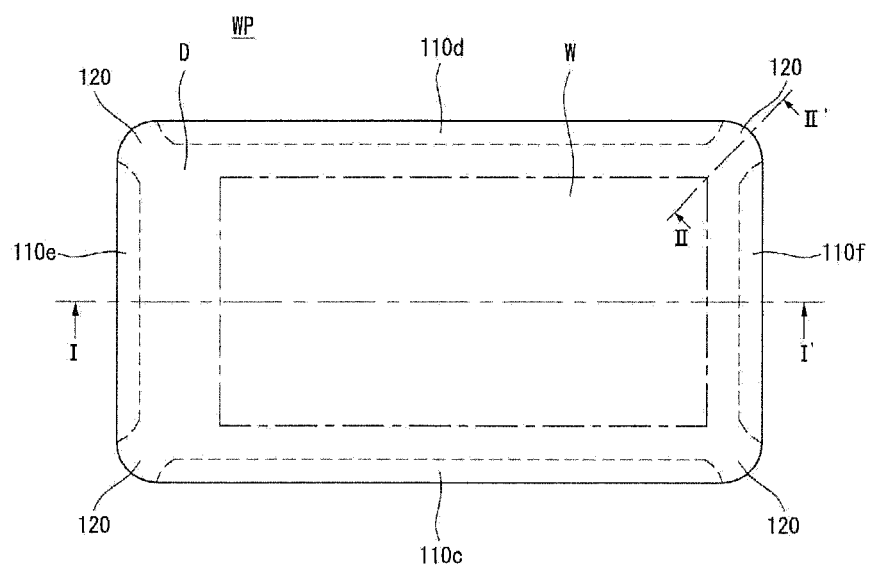
FIG. 2B is a plan view illustrating a window panel according to an embodiment of this document.
Figure 2C:
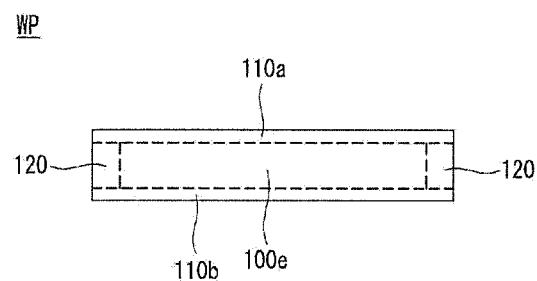
FIG. 2C is a left side view illustrating the window panel shown in FIG. 2B.
Figure 2D:
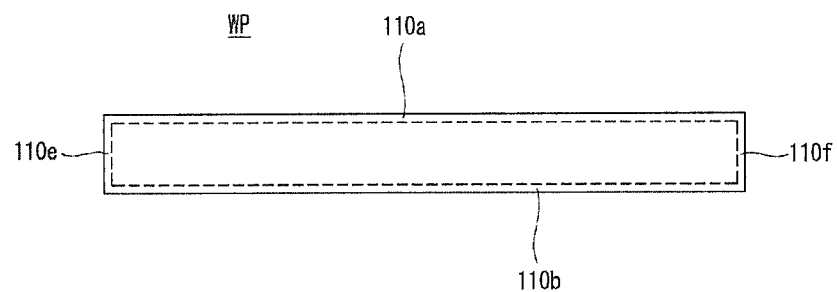
FIG. 2D is a cross sectional view taken along line I-I' of FIG. 2B.
Figure 2E:
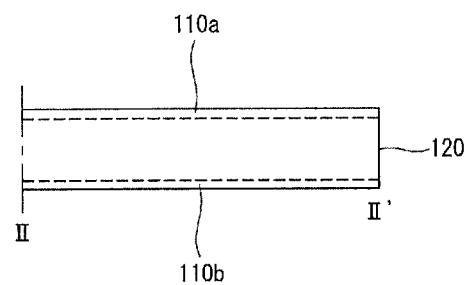
FIG. 2E is a cross sectional view taken along line II-II' of FIG. 2B.

First of all, a window panel according to an embodiment of this document is described with reference to FIGS. 2A to 2E. FIG. 2A is a perspective view illustrating a window panel according to an embodiment of this document, FIG. 2B is a plan view illustrating a window panel according to an embodiment of this document, FIG. 2C is a left side view illustrating the window panel shown in FIG. 2B, FIG. 2D is a cross sectional view taken along line I-I' of FIG. 2B, and FIG. 2E is a cross sectional view taken along line II-II' of FIG. 2B.

Referring to FIGS. 2A to 2D, a window panel WP includes a transparent substrate 100. The transparent substrate 100 includes a window area W through which an image can be viewed, and a peripheral area D surrounding the window area W. Although in the present embodiment, the window panel WP includes the window area W and the peripheral area D, the embodiments of this document are not limited thereto. For example, the window panel WP may include an ornament layer (not shown) that is formed corresponding to the peripheral area D of the transparent substrate 100.

The window area W receives a touch input as well as displays an image output through a display apparatus. The peripheral area D is an area for printing a trademark or logo of a display maker or communication service provider or for forming an ornament layer thereon. The peripheral area D also functions to conceal wires for a touch screen panel when the window panel WP is applied onto a touch screen.

The window panel WP includes a rectangular transparent substrate 100 with top, bottom, front, rear, left, and right surfaces. An upper reinforced layer 110a and a lower reinforced layer 110b are formed at a predetermined thickness on the entire top surface and bottom surface, respectively, of the transparent substrate 100. As shown in FIG. 2B, a front reinforced layer 110c, rear reinforced layer 110d, a left reinforced layer 110e, and a right reinforced layer 110f are respectively formed at a predetermined thickness on parts of the front, rear, left, and right surfaces. The parts without the reinforced layers 110c, 110d, 110e, and 110f form a non-reinforced portion 120.

According to an embodiment of this document, the non-reinforced portion 120 is formed at corners of the transparent substrate 100, for example, at portions where the front surface of the transparent substrate 100 meets the left and right surfaces of the transparent substrate 100 and portions where the rear surface of the transparent substrate 100 meets the left and right surfaces of the transparent substrate 100. As a consequence, the non-reinforced portion 120 separates the front reinforced layer 110c from the left and right reinforced layers 110e and 110f and separates the rear reinforced layer 110d from the left and right reinforced layers 110e and 110f.

However, the embodiments of this document are not limited thereto. For example, according to an embodiment of this document, the non-reinforced portion 120 may be formed at least one of the portions where the front surface of the transparent substrate 100 meets the left and right surfaces of the transparent substrate 100 and the portions where the rear surface of the transparent substrate 100 meets the left and right surfaces of the transparent substrate 100. According to an embodiment of this document, the non-reinforced portion 120 may be formed at part of at least one of the front, rear, left, and right surfaces of the transparent substrate 100.

According to embodiments of this document, the window panel may have various shapes, such as a circle, an ellipse, a polygon, or a combination thereof. In this case, the non-reinforced portion 120 is formed at at least one part of a side surface connecting a top edge portion of the transparent substrate 100 to a bottom edge portion of the transparent substrate 100.

Figure 3:
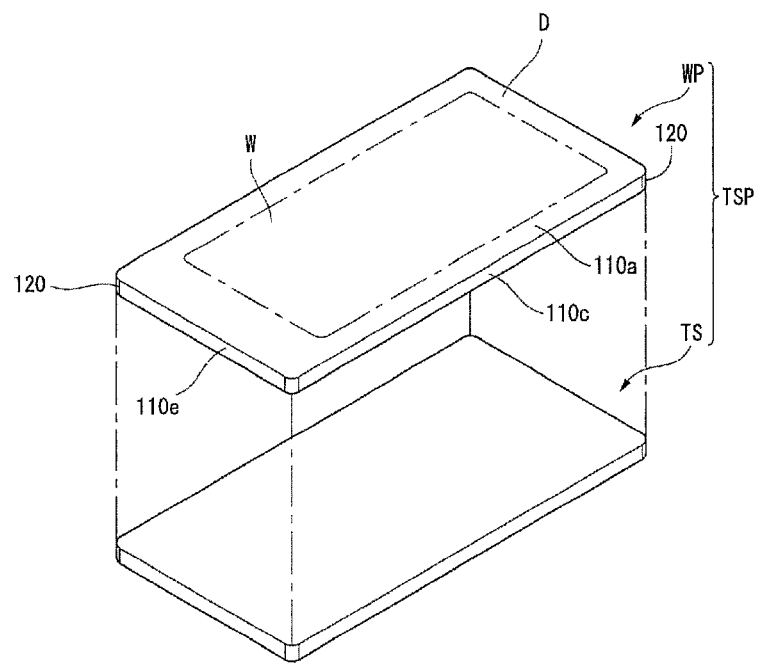
FIG. 3 is a cross sectional view illustrating a window panel integrated type touch screen panel having a window panel according to an embodiment of this document.

FIG. 3 is a cross sectional view illustrating a window panel integrated type touch screen panel having a window panel according to an embodiment of this document.

Referring to FIG. 3, a window panel integrated type touch screen panel TSP includes a window panel WP and a touch electrode layer TS on a surface of the window panel WP.

The window panel integrated type touch screen panel TSP according to the present embodiment allows the window panel WP to serve as a substrate of the touch screen panel TSP, thus decreasing the thickness of the entire device.

Figure 4A:
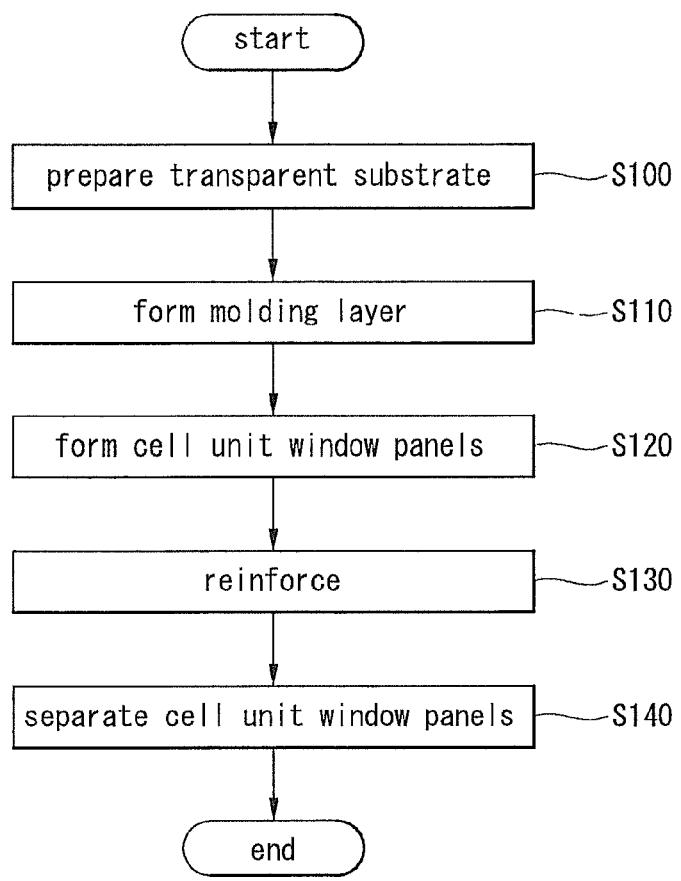
FIG. 4A is a flowchart illustrating a method of manufacturing a window panel according to an embodiment of this document.

Referring to FIG. 4A, a method of manufacturing a window panel according to an embodiment of this document is described. FIG. 4A is a flowchart illustrating a method of manufacturing a window panel according to an embodiment of this document.

Referring to FIG. 4A, a method of manufacturing a window panel according to an embodiment includes the steps of preparing for a whole sheet transparent substrate having a predetermined size (S100), forming a molding layer including a shape of a plurality of cell unit window panels on the whole sheet transparent substrate (S110), removing a predetermined portion of the transparent substrate according to the shape of the molding layer to form the plurality of cell unit window panels (S120), reinforcing the plurality of cell unit window panels (S130), and separating the plurality of cell unit window panels from each other (S140).

Each step is now described in greater detail.

In step S100, a whole sheet transparent substrate having a predetermined size is prepared.

In step S110, a molding layer is formed on the whole sheet transparent substrate. The molding layer has a shape of cell unit window panels to be formed. The cell unit window panels are connected to each other by at least one connector not to be separated from each other.

In step S120, an etchant is jetted over the whole sheet transparent substrate having the molding layer formed thereon, and portions with no molding layer formed are etched out, thereby forming a plurality of cell unit window panels connected to each other by connection portions.

As methods of forming the plurality of cell unit window panels connected to each other according to the shape of the molding layer after the formation of the molding layer, a photolithography method, CNC (Computerized Numerical Control) mechanical method, or laser cutting method are present.

The photolithography method first coats a photosensitive resin on the whole sheet transparent substrate so that a shape of cell unit window panels to be formed is obtained, and then, irradiates UV rays thereon to form a cured portion and a non-cured portion. Thereafter, the non-cured portion is removed by an etchant, thereby forming the plurality of cell unit window panels connected to each other by at least one connection portion.

In the CNC mechanical method, after coating a photosensitive resin on the whole sheet transparent substrate, UV rays are irradiated onto the photosensitive resin to form a cured portion and a non-cured portion. Thereafter, the non-cured portion is eliminated by applying ultra micro sand powder-contained air onto the non-cured portion while moving the CNC machine in X and Y directions according to a CNC process program. Also by this CNC mechanical method, a plurality of cell unit window panels connected to each other by at least one connection portion can be formed.

As other mechanical methods for forming the plurality of cell unit window panels, a scribing process and breaking process can be adopted. The scribing process forms cut-off lines on the transparent substrate using a diamond pen having hardness higher than that of the transparent substrate. The breaking process cuts the transparent substrate by exerting a force onto the cut-off lines.

In the laser cutting method, laser beams are illuminated onto the whole sheet substrate having the molding layer to cut off a part of the transparent substrate according to the shape of the molding layer, thereby forming the plurality of cell unit window panels connected to each other by at least one connection portion.

In step S130, the plurality of interconnected cell unit window panels formed in step S120 are reinforced by heat or chemical treatment.

In the case that the window panels are formed of glass, the chemical treatment is used. In the chemical treatment, the interconnected cell unit window panels are dipped into a reinforcement solution containing potassium nitrate and ceramic pigment liquid at a temperature ranging from about 400° C. to about 500° C. for about 4 hours to about 5 hours. Then, sodium ions (relatively smaller size ions) in the glass are replaced with potassium ions (relatively larger size ions) in the potassium nitrate solution. That is, sodium ions are emitted from the glass to leave empty portions in the glass, and potassium ions start to fill the empty portions, thus resulting in rise of the surface density of the glass. Therefore, surface reinforcement of the glass is achieved. As a consequence, the reinforced layers 110a to 110f as shown in FIGS. 2A to 2E are formed at the cut-off portions of the whole sheet transparent substrate without a change in thickness. The ceramic pigment liquid functions to make the glass look better in color as well as to reinforce the glass.

Although in the present embodiment the reinforcement solution contains potassium nitrate and ceramic pigment liquid, the embodiments of this document are not limited thereto. For example, according to an embodiment of this document, the composition of the reinforcement solution can vary depending on material for the window panels. According to an embodiment of this document, any other materials that can perform surface reinforcement can be used for the reinforcement solution.

Figure 6A:
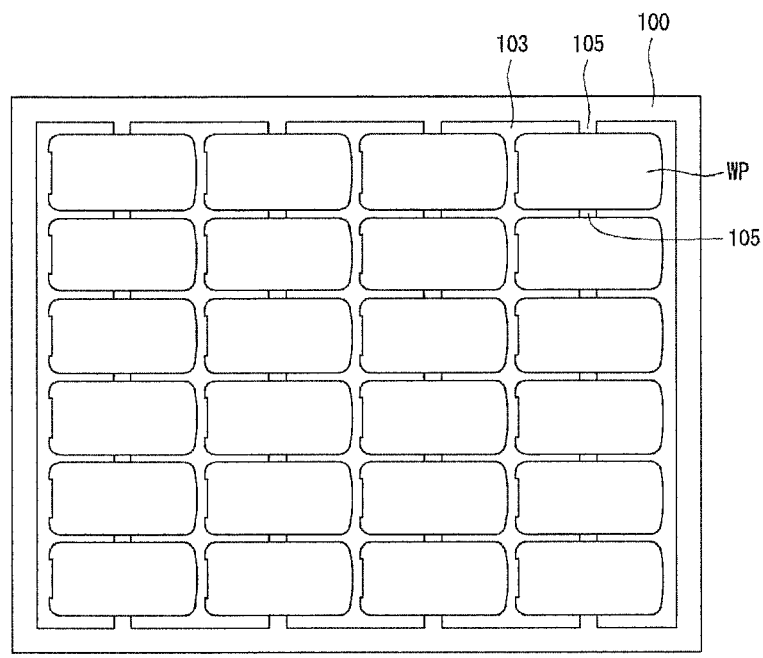
FIGS. 6A to 6C are plan views illustrating various embodiments of a plurality of cell unit window panels which are connected to each other.
Figure 6B:
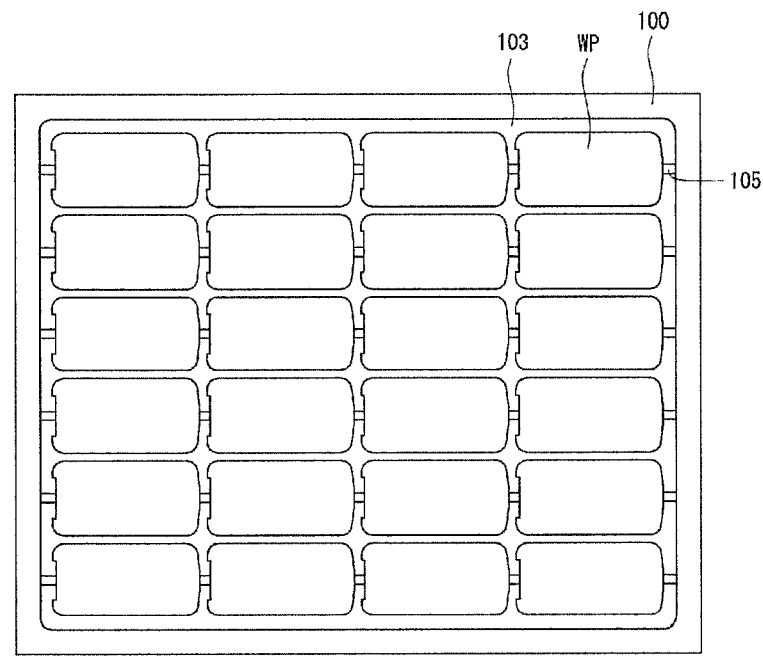
Figure 6C:
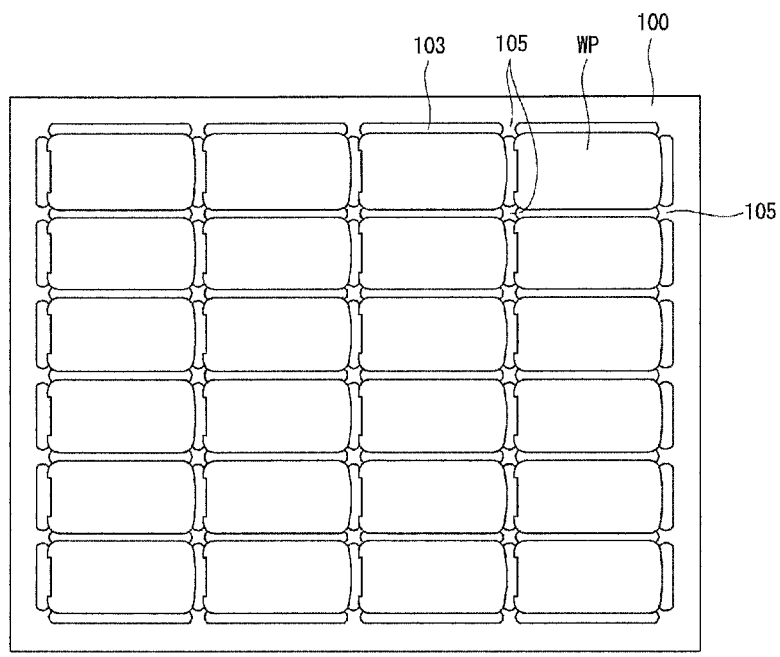

As described above, the plurality of cell unit window panels WP connected to each other by connection portions, such as connection portions 105 of FIGS. 6A to 6C to be described infra, are dipped all together in the reinforcement solution, which can significantly reduce time required for reinforcement compared to reinforcing the cell unit window panels WP one by one.

In step S140, the connection portions, such as the connection portions 105 of FIGS. 6A to 6C to be described below, are removed to separate the plurality of cell unit window panels WP from each other, thereby forming window panels independent from each other.

Figure 4B:
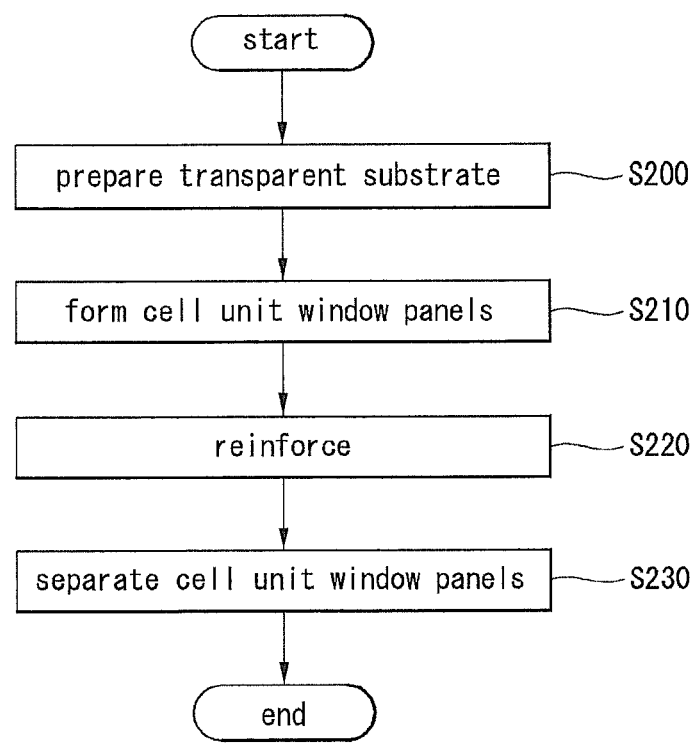
FIG. 4B is a flowchart illustrating a method of manufacturing a window panel according to another embodiment of this document.

Referring to FIG. 4B, a method of manufacturing a window panel according to an embodiment is described. FIG. 4B is a flowchart illustrating a method of manufacturing a window panel according to an embodiment.

Referring to FIG. 4B, a method of manufacturing a window panel according to an embodiment includes the steps of preparing for a whole sheet transparent substrate having a predetermined size (S200), removing a predetermined portion of the transparent substrate to form a plurality of cell unit window panels (S210), reinforcing the plurality of cell unit window panels, and separating the plurality of cell unit window panels from each other (S230).

The manufacturing method illustrated in FIG. 4B is the same or substantially the same as the manufacturing method illustrated in FIG. 4A except for forming the plurality of cell unit window panels using a laser cutting method or mechanical processing method without forming a molding layer. Accordingly, to avoid repetitive description, only a step (S210) of forming a plurality of cell unit window panels is described.

In step S210, a plurality of cell unit window panels are formed using a mechanical method or laser cutting method.

In accordance with the mechanical method, the transparent substrate is cut according to a program input with a shape of cell unit window panels to be formed, thereby forming a plurality of cell unit window panels connected to each other by at least one connection portion.

In the laser cutting method, laser beams are irradiated onto the whole sheet transparent substrate based on a program input with a shape of cell unit window panels to be formed to cut off a portion of the transparent substrate, thereby forming a plurality of cell unit window panels connected to each other by at least one connection portion.

Figure 5A:
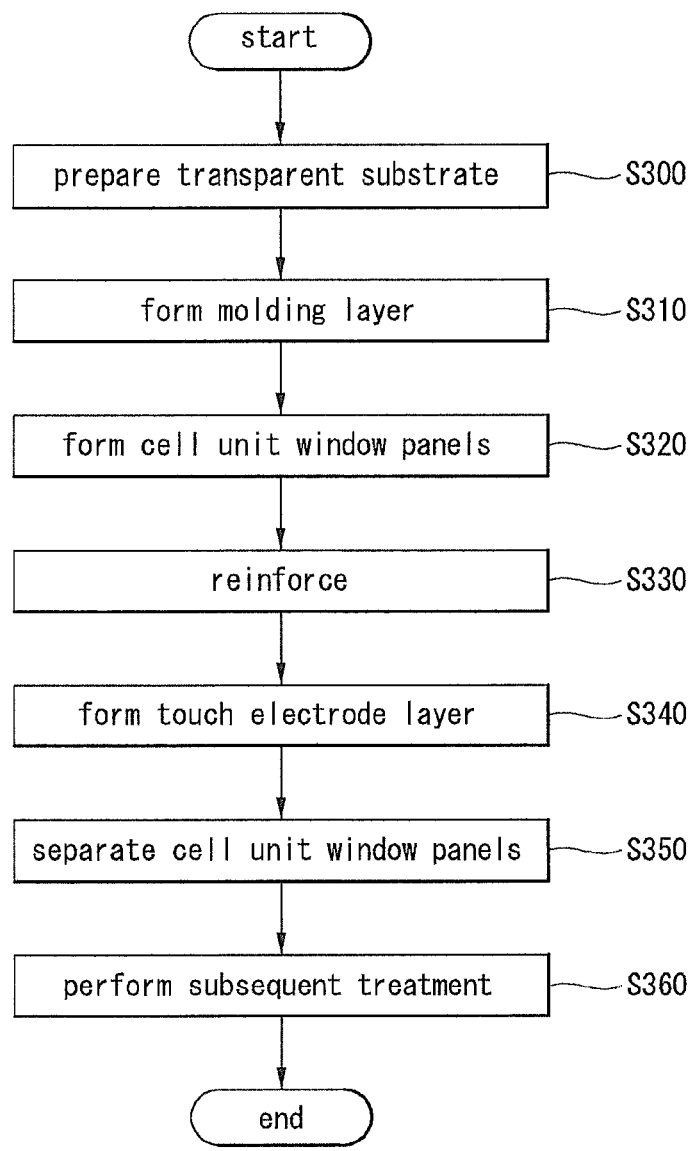
FIG. 5A is a flowchart illustrating a method of manufacturing a window panel-integrated touch screen panel according to an embodiment of this document.

Next, a method of manufacturing a window panel integrated type touch screen panel according to an embodiment of this document is described with reference to FIG. 5A. FIG. 5A is a flowchart illustrating a method of manufacturing a window panel integrated type touch screen panel according to an embodiment of this document.

Referring to FIG. 5A, a method of manufacturing a window panel integrated type touch screen panel according to an embodiment of this document includes the steps of preparing for a whole sheet transparent substrate having a predetermined size (S300), forming a molding layer having a shape of a plurality of cell unit window panels to be formed on the whole sheet transparent substrate (S310), removing a predetermined portion of the transparent substrate according to the shape of the molding layer to form the plurality of cell unit window panels (S320), reinforcing the plurality of cell unit window panels (S330), forming a touch electrode layer on a surface of each of the plurality of cell unit window panels to form a touch screen panel (S340), separating the plurality of cell unit window panels from each other (S350), and performing a subsequent treatment (S360).

Steps S300 to S330 illustrated in FIG. 5A are the same or substantially the same as steps S100 to S130 illustrated in FIG. 4A, and step S350 in FIG. 5A is the same or substantially the same as step S140 in FIG. 4A. Accordingly, to avoid repetitive description, only steps S340 to S360 are described thereafter.

In step S340, touch electrode layers are formed on the plurality of cell unit window panels that has been formed in step S320 and enforced in step S330, thus forming a plurality of cell unit touch screen panels. The structure and manufacturing method of the touch screen panel do not constitute essential part of this document, and thus detailed description thereof is omitted.

In step S360, it is tested whether an error is present or absent on the independent window panel integrated type touch screen panel.

Figure 5B:
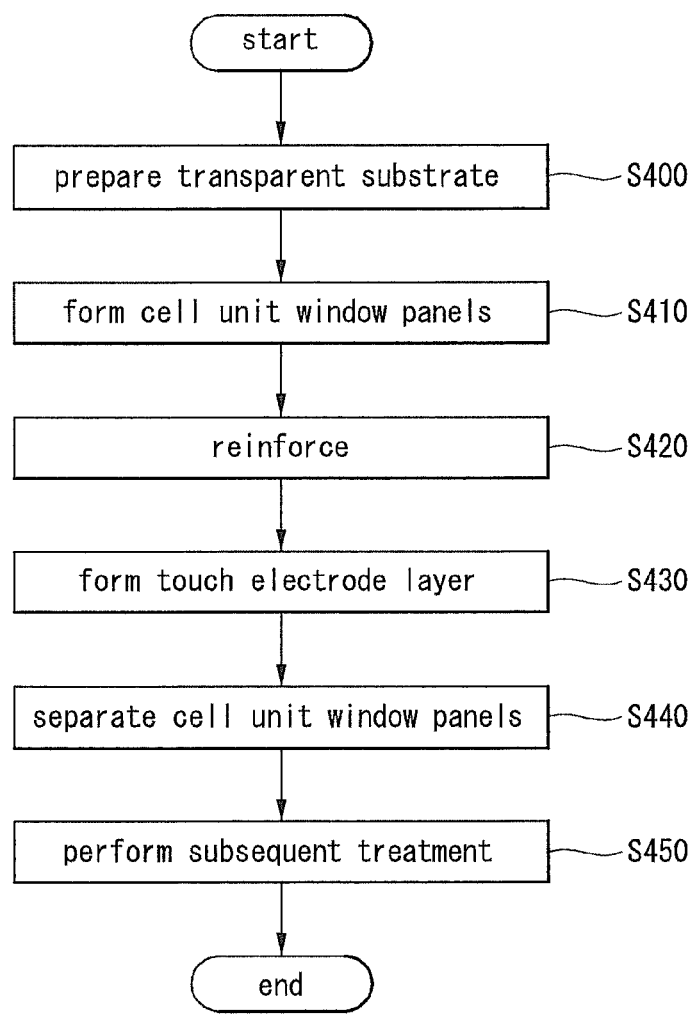
FIG. 5B is a flowchart illustrating a method of manufacturing a window panel-integrated touch screen panel according to another embodiment of this document.

Thereafter, a method of manufacturing a window panel integrated type touch screen panel according to an embodiment of this document is described with reference to FIG. 5B. FIG. 5B is a flowchart illustrating a method of manufacturing a window panel-integrated touch screen panel according to an embodiment.

Referring to FIG. 5B, a method of manufacturing a window panel integrated type touch screen panel according to an embodiment of this document includes the steps of preparing for a whole sheet transparent substrate having a predetermined size (S400), removing a predetermined region of the transparent substrate to form a plurality of cell unit window panels (S410), reinforcing the plurality of cell unit window panels (S420), forming a touch electrode layer on a surface of each of the plurality of cell unit window panels (S430), separating the plurality of cell unit window panels from each other (S440), and performing a subsequent treatment (S450).

Steps S400 to S420 illustrated in FIG. 5B are the same or substantially the same as steps S200 to S220 illustrated in FIG. 4B, and steps S430 to S450 in FIG. 5B are the same or substantially the same as steps S340 to S360 in FIG. 5A. To avoid repetitive description, detailed description thereof is omitted.

FIGS. 6A to 6C illustrate shapes of the plurality of cell unit window panels as formed in step S120 of FIG. 4A, step S210 of FIG. 4B, step S320 of FIG. 5A, and step S410 of FIG. 5B, wherein FIG. 6A is a plan view illustrating that connection portions 105 are formed between the front and rear surfaces of the cell unit window panels WP as viewed from the drawing, FIG. 6B is a plan view illustrating that connection portions 105 are formed between the left and right surfaces of the cell unit window panels WP as viewed from the drawing, and FIG. 6C is a plan view illustrating that connection portions 105 are formed at corners of the cell unit window panels WP as viewed from the drawing. In FIGS.

6A to 6C, the reference numeral 100 refers to a whole sheet transparent substrate, and the reference numeral 103 refers to openings that are formed by removing parts of the whole sheet transparent substrate 100.

Although in FIGS. 6A to 6C two connection portions 105 (refer to FIGS. 6A and 6B) or four c connection portions 105 (refer to FIG. 6C) are provided for each of the plurality of cell unit window panels WP, the embodiments of this document are not limited thereto. For instance, according to embodiments, the connection portions 105 may be varied in shape and number so that the plurality of cell unit window panels WP are not separated independently from each other. As long as such function can be achieved, any position or number of the connectors 105 may be available.

Figure 7A:
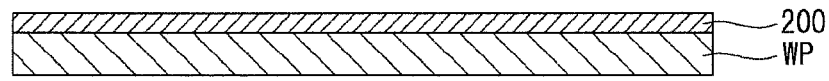
FIGS. 7A and 7B are cross sectional views illustrating processes forming an ornament layer on a window panel.
Figure 7B:
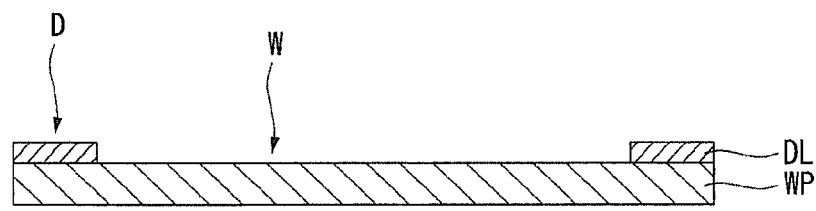

FIGS. 7A and 7B are cross sectional views illustrating forming an ornament layer on a window panel WP.

Referring to FIG. 7A, a non-conductive film 200 is coated on a surface of a cell unit window panel WP. The formation of the non-conductive film 200 is achieved by deposition of a non-conductive metal, non-conductive oxide, or non-conductive nitride in the vacuum atmosphere.

Next, as shown in FIG. 7B, non-conductive ink is applied on ornament portions D of the non-conductive film 200 using a silkscreen printer and then dried using, e.g., a hot air drier. Then, the non-conductive film 200 is removed from a window area of the window panel while leaving the ornament portions D, thereby forming an ornament layer DL having the ornament portions D and window area W.

According to the embodiments of this document, the plurality of cell unit window panels are reinforced all together while being connected to each other by the connection portions. Accordingly, workability and fabrication throughput can be remarkably enhanced compared to the conventional manufacturing methods of cell unit window panels.

Further, touch electrode layers are formed on the plurality of cell unit window panels, thereby forming a plurality of touch screen panels. Accordingly, a jig is unnecessary that is used when manufacturing touch screen panels on a cell unit window panels. As a consequence, it is not required to consider x, y, and z-axis directional tolerances between a seating portion of the jig and each cell unit window panel and a deviation of each cell unit window panel, thereby resulting in an enhancement in workability and throughput.

Further, the connection portions are provided at only some part of the cell unit window panels. Thus, even when the connection portions are removed, the likelihood of damage to the entire product due to cracks can be substantially reduced since the non-reinforced portions are present only at the areas where the connection portions are formed.

The embodiments of this document have been explained above with reference to the accompanying drawings. It will be evident to those skilled in the art that various modifications may be made thereto without departing from the broader spirit and scope of the embodiments. Further, although the embodiments have been described in the context its implementation in particular environments and for particular applications, those skilled in the art will recognize that the usefulness of the embodiments is not limited thereto and that the embodiments can be beneficially utilized in any number of environments and implementations. The foregoing description and drawings are, accordingly, to be regarded in an illustrative rather than a restrictive sense.

What is claimed is:

1. A method of manufacturing a window panel, comprising:
   preparing a transparent substrate having a predetermined size;
   removing portions of the transparent substrate through an entire thickness of the transparent substrate to form a plurality of cell unit window panels separated from each other except being connected to each other by at least one connection portion;
   reinforcing the plurality of cell unit window panels connected to each other by the at least one connection portion; and
   removing the at least one connection portion from the plurality of the reinforced cell unit window panels to separate the plurality of the reinforced cell unit window panels from each other.

2. The method of claim 1, wherein removing the portions of the transparent substrate to form the plurality of cell unit window panels comprises:
   forming a molding layer having shapes of the cell unit window panels on the transparent substrate; and
   removing the portions of the transparent substrate through the entire thickness of the transparent substrate according to the shapes of the molding layer to form the plurality of cell unit window panels separated from each other except being connected to each other by the at least one connection portion.

3. The method of claim 1, wherein removing the portions of the transparent substrate is performed by any one of an etching process, a laser process, and a mechanical process.

4. The method of claim 1, wherein reinforcing the plurality of cell unit window panels comprises dipping the plurality of cell unit window panels in a reinforcement solution.

5. The method of claim 2, wherein the removing of the portions of the transparent substrate includes applying an etchant over the transparent substrate with the molding layer thereon to etch out the portions of the transparent substrate not covered by the molding layer.

6. The method of claim 1, wherein the cell unit window panels have a substantially rectangular shape, and the at least one connection portion connects the cell unit window panels to each other at respective long sides of the cell unit window panels.

7. The method of claim 1, wherein the cell unit window panels have a substantially rectangular shape, and the at least one connection portion connects the cell unit window panels to each other at respective short sides of the cell unit window panels.

8. The method of claim 1, wherein the cell unit window panels have a substantially rectangular shape, and the at least one connection portion connects the cell unit window panels to each other at respective corners of the cell unit window panels.

9. A method of manufacturing a window panel-integrated touch screen panel, comprising:
   preparing a transparent substrate having a predetermined size;
   removing portions of the transparent substrate through an entire thickness of the transparent substrate to form a plurality of cell unit window panels separated from each other except being connected to each other by at least one connection portion;
   reinforcing the plurality of cell unit window panels connected to each other by the at least one connection portion;
   forming touch electrodes on the plurality of cell unit window panels, respectively, to form a plurality of touch screen panels connected to each other by the at least one connection portion; and removing the at least one connection portion from the plurality of touch screen panels to separate the plurality of touch screen panels from each other.

10. The method of claim 9, wherein removing the portions of the transparent substrate to form the plurality of cell unit window panels comprises:

forming a molding layer having shapes of the cell unit window panels on the transparent substrate; and removing the portions of the transparent substrate through the entire thickness of the transparent substrate according to the shapes of the molding layer to form the plurality of cell unit window panels separated from each other except being connected to each other by the at least one connection portion.

11. The method of claim 9, wherein removing the portions of the transparent substrate is performed by any one of an etching process, a laser process, and a mechanical process.

12. The method of claim 9, wherein reinforcing the plurality of cell unit window panels comprises dipping the plurality of cell unit window panels in a reinforcement solution.

13. The method of claim 10, wherein the removing of the portions of the transparent substrate includes applying an etchant over the transparent substrate with the molding layer thereon to etch out the portions of the transparent substrate not covered by the molding layer.

14. A method of manufacturing a reinforced window panel, comprising:

preparing a transparent substrate;

forming a window panel and at least one other window panel from the transparent substrate by removing portions of the transparent substrate to form openings in the transparent substrate, the window panel and the at least one other window panel being separated from each other except being connected to each other by at least one connection portion;

reinforcing the window panel connected to the at least one other window panel by the at least one connection portion; and removing the at least one connection portion to separate the reinforced window panel from the at least one other window panel.

15. The method of claim 14, wherein the forming of the window panel and the at least one other window panel includes:

forming a molding layer having shapes of the window panel and the at least one other window panel on the transparent substrate; and removing portions of the transparent substrate not covered by the molding layer trough an entire thickness of the transparent substrate to form the window panel and the at least one other window panel from the transparent substrate.

16. The method of claim 15, wherein the removing of the portions of the transparent substrate not covered by the molding layer includes applying an etchant over the transparent substrate with the molding layer thereon to etch out the portions of the transparent substrate not covered by the molding layer.

17. The method of claim 14, wherein the forming of the window panel and the at least one other window panel is performed by any one of an etching process, a laser process, and a mechanical process.

18. The method of claim 14, wherein the reinforcing of the window panel includes dipping the window panel and the at least one other window panel in a reinforcement solution.

19. The method of claim 14, further comprising forming touch electrode layers on the reinforced window panel.

20. The method of claim 19, wherein the forming of the touch electrode layers is performed prior to the removing of the at least one connection portion.

* * * * *